United States Patent Office 3,439,475
Patented Apr. 22, 1969

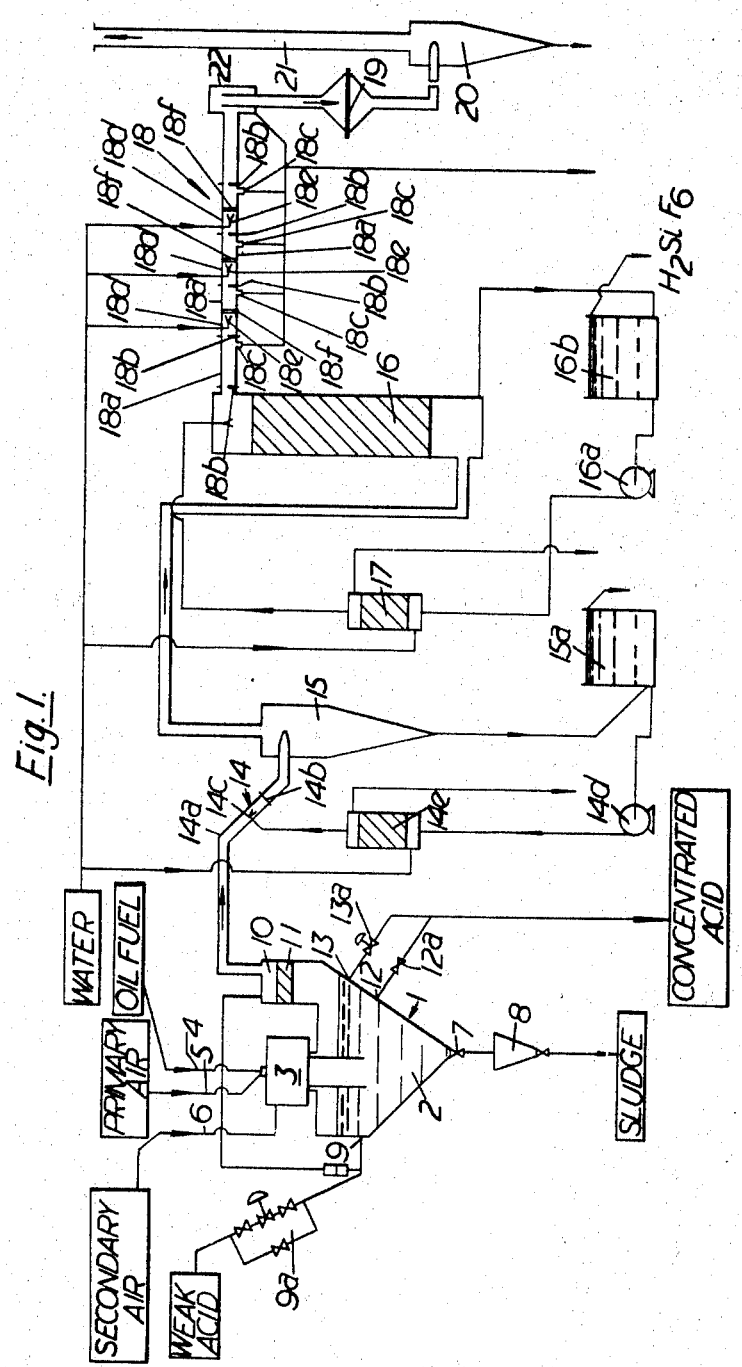

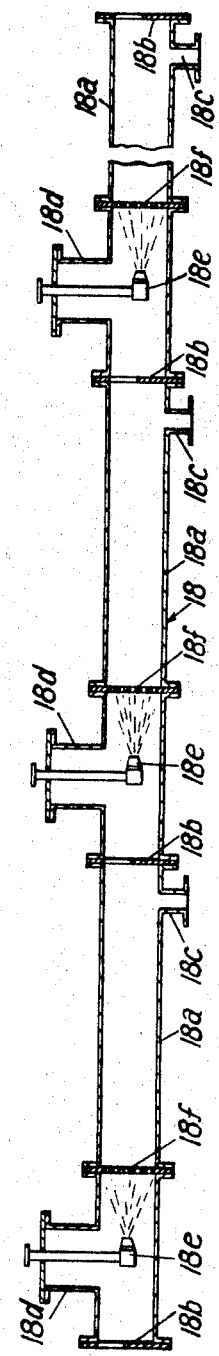

3,439,475
GAS/LIQUID CONTACTING DEVICES AND THE OPERATION THEREOF
James Austin, Maidenhead, and John D. Ellis, Chalfont St. Giles, England, assignors to Nordac Limited, Uxbridge, Middlesex, England, a British corporation
Continuation of application Ser. No. 440,184, Mar. 16, 1965. This application Nov. 9, 1967, Ser. No. 681,938
Claims priority, application Great Britain, Apr. 23, 1964, 16,797/64, 16,798/64
Int. Cl. B01d 47/06, 47/12
U.S. Cl. 55—90
3 Claims

ABSTRACT OF THE DISCLOSURE

Gas/liquid contacting device which comprises a duct obturated by a barrier, a means for spraying coarse droplets of water to impinge on the upstream face of the barrier and cause the droplets to break into smaller droplets that move parallel to the barrier to intercept and intimately mix with a gas stream, the barrier having apertures adapted to provide a gas velocity therethrough in the range of 100–400 feet per second to give rise to a pressure drop of at least 15 inches water gauge, and a method for cleaning gases which comprises passing a gas stream through a zone at a velocity of 15–100 feet per second, causing the gas stream to flow at 50–400 feet per second through the apertures in a barrier obturating the zone to produce a pressure drop not less than one inch water gauge, causing coarse liquid droplets to impinge on the face of the barrier, and preventing an accumulation of water on the downstream face of the barrier.

---

This application is a continuation of application 440,184 filed Mar. 16, 1965 and now abandoned.

This invention concerns gas/liquid contacting devices and the operation thereof, and has for one objective the provision of devices that may be utilised as gas scrubbers or as gas coolers for the absorption and/or elimination from a gas stream of gaseous, droplet or particulate constituents of such stream. A further objective of the invention is to provide a gas/liquid contacting device which is of simple construction and readily adaptable to diverse applications.

Another objective is to provide effluent treating methods capable of effectively handling the exhaust effluent of submerged combustion units used for concentrating liquids.

A gas/liquid contacting device suitable for carrying out the method in accordance with the present invention comprises a duct obturated by a barrier having a plurality of apertures therein for the passage of a gas stream through the duct, and liquid spray means adapted to direct liquid at the upstream face of said barrier to cause coarse liquid droplets to impinge on such barrier face in the region of said apertures and to break into smaller droplets that move generally parallel with the said face of the barrier, thereby to intercept and intimately mix with a gas stream flowing through said duct and barrier apertures.

Preferably the apertures in said barrier will be substantially circular with diameters in the range ⅛" to 1", the size and number of the apertures being selected to give rise to an appropriate relationship between the gas stream velocities in the duct and through the apertures respectively and in accordance with the required effect of the device.

Thus, in the case of a device adapted to be employed primarily as a scrubber, the size and number of apertures in the barrier will preferably be so selected as to give rise to a gas pressure drop across the barrier of at least 15" W.G. and ranging up to 40" W.G. or higher, desirably in the range 35" to 40" W.G., with a gas velocity through the apertures in the range 100 to 400 feet per second, desirably 300 to 350 feet per second.

On the other hand, in the case of a device intended to function primarily as a gas cooler, the number and size of the apertures in the barrier will preferably be so selected as to achieve a gas velocity through the apertures in the range 50 to 150 feet per second, desirably in the range 80 to 100 feet per second, with a relatively low pressure drop, desirably not more than 4" W.G., across the barrier.

Preferably the duct will have a cross-sectional area such that the gas velocity therein is in the range 15 to 100 feet per second, i.e. a velocity within the range of values normally encountered in gas-flow pipework in chemical plants.

A device in accordance with the invention may be adapted to operate in any desired attitude and may thus be embodied in a desired pipe run of chemical plant without difficulty. For instance, the device may operate with the duct vertical or horizontal or with the duct inclined. In the case of devices adapted for operation in a horizontal attitude or in any attitude in which there is the possibility of the sprayed liquid running upstream with respect to he gas-flow direction, the device may conveniently incorporate a liquid-retaining step upstream of the barrier to prevent liquid flowing upstream of such step, the duct further including a suitable drain for escape of liquid trapped between the barrier and the step. Thus, the duct upstream of said barrier may be partially obturated by a plate having a D-shaped aperture providing a gas-flow path through the upper segment of the duct cross-section.

It should, however, be understood that in view of certain difficulties in separating the sprayed liquid from the gas upstream of the barrier and in disposing of liquid accumulating on the downstream face of the barrier, it is preferred to avoid operation of a device of the invention in a vertical or near-vertical attitude with an upward gas-flow path through the device.

The material of the duct (or its lining) and of the barrier will, of course, be selected to withstand the conditions under which the device is to operate in any particular application thereof.

In view of their simplicity, a plurality of devices in accordance with the invention may be used in a series arrangement to provide an effect equivalent to a single more complex device of higher capital cost. Such a series of devices is particularly useful for gas cooling or for condensing steam or other vapours in that the quantity of sprayed liquid (e.g. water) required to obtain a given cooling or condensing effect need not substantially exceed that required by the equivalent single more complex countercurrent gas cooling device of conventional form.

Whilst the devices in accordance with the invention are applicable to the scrubbing and/or cooling of gas streams in numerous situations, or for condensing steam or other vapours, they are particularly applicable to scrubbing and/or cooling of the exhaust effluent of plants involving evaporation of liquids (e.g. for solution concentration) by submerged combustion units.

The evaporation of liquids by the submerged combustion technique in which the liquid to be evaporated is exposed to a flame submerged in the liquid ,or has combustion products bubbled therethrough, has well-known economic advantages in that the thermal efficiency of such technique is very high. However, it is also well-known that the exhaust effluent escaping from the body of the liquid is, in many cases, heavily contaminated with material present in the liquid and that the effluent must be treated to recover valuable constituents entrained therein and to avoid, as far as possible, the escape into the atmosphere of noxious materials. The nature of the effluent contaminants depends of course on the liquid and the materials contained therein and, in many cases, the effective removal of such contaminants, often in the form of a very fine mist of solid and/or liquid particles, is extremely difficult and can only be accomplished by complex treatment plant.

Thus, the use of submerged combustion units for many purposes for which such units would seem appropriate has hitherto been regarded as impracticable owing to the difficulty of dealing with the effluent and/or the complexity of the effluent-treatment plant required to achieve an acceptably low level of atmospheric pollution; devices in accordance with the present invention provide a simple and reliable means of effecting the appropriate treatment of such exhaust effluent and render possible the efficient operation of units of this kind for the evaporation of many liquids which hitherto had been thought to be incapable of evaporation by such units without complex and expensive effluent-treating arrangements.

Thus the present invention further provides apparatus comprising a scrubber including a duct obturated by a barrier having a plurality of apertures therein for the passage of gaseous effluent through the duct, the size and number of the apertures being selected to give rise to a gas pressure across the barrier in the range 20 to 40 inches W.G., with an effluent velocity through the apertures in the range 100 to 400 feet per second, and liquid-spray means adapted to direct liquid at the upstream face of said barrier to cause coarse liquid droplets to impinge on such barrier face in the region of said apertures and to break into smaller droplets that move generally parallel with the said face of the barrier, thereby to intercept and intimately mix with effluent flowing through said duct and barrier apertures, the appartus further comprising, downstream of said scrubber, a gas/liquid separator such as a cyclone.

Where necessary, having regard to the nature of the effluent to be treated, the apparatus may include a second scrubber downstream of the gas/liquid separator and a second gas/liquid separator downstream of this further scrubber, the second scrubber and second separator serving, of course, to eliminate or further reduce the contamination of the effluent leaving the first separator.

Such a two-stage arrangement is particularly suitable for dealing with the effluent from a submerged combustion unit used for concentrating wet process phosphoric acid, the effluent of such a unit being contaminated with very finely divided particles containing phosphorus compounds and fluorine compounds. Thus, with such a two-stage scrubber, the first stage thereof would typically operate at high temperature, the sprayed liquid in that stage being hot weak acid which is recovered from the separator of that stage and recirculated with water make-up, the stage operating conditions being chosen to remove mainly phosphorus compounds from the effluent. The second stage of the scrubber would then operate with cold water (fresh or sea) as the sprayed liquid to serve the dual purpose of cooling the effluent and removing soluble fluorine compounds therefrom, such compounds having only low solubility in the hot acid sprayed in the first stage and thus remaining as important contaminants of the effluent entering the second stage. The removal of such contaminants in the second stage is dependent on the exit temperature of the effluent therefrom, low exit temperatures giving optimum removal of these contaminants.

The gas/liquid separator (or the final separator of a plural stage scrubber/separator arrangement) may be followed by one or more gas-cooling stages for not only aiding in eliminating residual solid particles entrained in the gas leaving the separator but also for facilitating separation of volatile contaminants from the effluent.

Such an arrangement is particularly valuable in dealing with the effluent of a submerged combustion unit concentrating wet process phosphoric acid, especially when the scrubber or scrubbers are operated under conditions designed primarily to effect removal of phosphorus compounds at the expense of low removal of fluorine compounds, in that the gas-cooling stage or stages enable volatile effluent contanimants such as fluorine compounds which tend to pass the scrubber(s) and separator(s) to be removed by absorption in cooling water in the gas-cooling stage(s).

The absorption of certain fluorine compounds in one or more gas-cooling stages as above described is particularly efficient since in such stages conditions are appropriate for hydrolysis of the principal contaminant, $SiF_4$, to HF, $SiO_2$ and $H_2 SiF_6$ which are individually readily scrubbed from the gas by the cooling water.

The effluent gas leaving the gas-cooler may be subjected to filtration to remove any residual particulate matter and/or to agglomerate fine droplets entrained in the gas and may finally pass through a gas/liquid separating device to separate from the filtered gas stream agglomerated liquid droplets. Such an arrangement, incorporating a fibre filter and cyclone separator, is particularly desirable in the case of plant for concentrating wet process phosphoric acid, since the filter and cyclone separator will serve to remove hydrofluosilicic acid that tends to pass the gass cooler.

The accompanying drawings illustrate, by way of non-limitative example, effluent-treating apparatus incorporating typical gas/liquid contacting devices constructed and operating in accordance with the invention. In the drawings:

FIGURE 1 is a schematic representation of a submerged combustion evaporation plant, for concentrating wet-process phosphoric acid, effluent-treating apparatus embodying the invention; and FIGURE 2 is a longitudinal section of a three-stage gas-cooler forming part of the effluent-treating apparatus of the plant of FIGURE 1.

Referring to FIGURE 1 of the drawings, the illustrated plant comprises a submerged combustion evaporator unit 1 comprising a tank 2 equipped with a submerged combustion burner 3 of conventional form fed with oil fuel, primary air and secondary air via lines 4, 5, 6 respectively. The evaporator tank 2 has a valved bottom outlet 7 connected to a cyclone separator 8 for removing sludge and solids deposited in the tank 2; an inlet 9 with associated control valves 9a for liquid to be concentrated; an exhaust effluent outlet 10 optionally including a primary filter screen 11 for minimising carry-over of concentrated liquid and other effluent contaminants to the effluent-treating apparatus that is connected to outlet 10; and outlets 12, 13 with associated control valves 12a, 13a for withdrawing concentrated liquid from the tank 2.

The evaporator unit 1 is intended to effect concentration of wet-process phosphoric acid and accordingly the liquid fed to inlet 9 is weak acid; the exhaust effluent leaving the outlet 10 when the evaporator unit 1 is operating will therefore comprise gaseous combustion products contaminated with very finely divided particles containing phosphorus compounds and fluorine compounds.

The outlet 10 of the evaporator 1 is connected to effluent-treating apparatus comprising, in sequence, a scrubber 14, a cyclone gas/liquid separator 15, hydrofluosilicic acid absorption column 16 with associated cooler 17, a three-stage gas-cooler 18, a fibre filter or agglomerator 19, and a cyclone gas/liquid separator 20, the gaseous discharge outlet of which is connected to a stack pipe 21.

The scrubber 14 is constituted by a gas/liquid contacting device in accordance with the invention and comprises a downwardly inclined duct 14a obturated by a barrier 14b in the form of a plate having such number of circular apertures of about ½ inch diameter as to give rise to a gas pressure-drop across the barrier in the range 35–40 inch W.G. with an effluent flow velocity through the apertures in the range 300–350 feet per second. Upstream of the barrier 14b, the scrubber duct 14a is fitted with a spray nozzle 14c adapted to direct a solid cone coarse spray of liquid (in this instance hot weak acid recovered from the cyclone separator 15) at a relatively low pressure (e.g. about 10 p.s.i.g.) at the upstream face of the barrier 14b so to cause relatively large droplets to impinge on the barrier over the whole area bounding the apertures and to break into smaller droplets that move generally parallel with the barrier across the apertures to intercept the effluent flowing therethrough.

Because the scrubber 14 receives hot exhaust effluent direct from outlet 10 of the evaporator unit and treats such effluent with hot weak acid, conditions in scrubber 14 are appropriate for removing the bulk of the phosphorus compounds (mainly $P_2O_5$) in the effluent, such compounds being absorbed in the hot weak acid which thereby becomes enriched with such compounds.

From the scrubber 14, the effluent and sprayed liquid passes to the cyclone separator 15 in which the liquid is separated from the gaseous effluent and drawn off to a tank 15a. From time to time, some liquid in tank 15a is recycled to the evaporator unit inlet 9 to be concentrated along with the weak acid feed thereto, whilst the remainder is diluted with water to restore it to an appropriate concentration and is fed by a pump 14d to the spray nozzle 14c of scrubber 14, the pumped liquid being cooled to the required temperature by passage through a water-cooled heat-exchanger 14e.

The partially-treated exhaust effluent leaving the cyclone separator 15 and substantially freed from phosphorus compounds passes to a fluorine removal stage constituted by the absorption column 16, gas-cooler 18, filter 19 and cyclone separator 20. It should here be noted that this stage is constituted by two complementary sub-stages, viz: the column 16 and the cooler 18 respectively. Either of these sub-stages could be omitted and the other constructed to achieve the desired overall fluorine-removing capacity; the illustrated arrangement is preferred when a substantial fluorine-removing capacity is required, for instance when the weak acid fed to the evaporator unit has a relatively high fluorine content and low $P_2O_5$ content (e.g. up to about 30% w./w.).

The column 16 is a conventional, countercurrent-flow packed column, the effluent entering the lower end of the column and flowing upwardly in countercurrent with a flow of dilute hydrofluosilicic acid fed by a pump 16a, from a tank 16b via water-cooled heat-exchanger 17, to the head of column 16. In the column 16, fluorine compounds (mainly $SiF_4$) in the effluent are hydrolysed (to HF, $SiO_2$ and $H_2SiF_6$ in the case of $SiF_4$) and absorbed by the acid flowing down the column, the acid leaving the bottom of the column being returned to tank 16b. From time to time, enriched acid is withdrawn from tank 16b and the concentration in the tank adjusted by dilution with water.

The effluent leaving the head of column 16 passes to gas-cooler 18, the construction of which is illustrated in greater detail in FIGURE 2. This is a three-stage cooler, each stage being constituted by a horizontal duct section 18a which is partially obturated at each end by a plate 18b having a D-shaped aperture in the upper part of its area, the plate thereby preventing back flow of liquid in the duct. Each stage further comprises a drain 18c in the duct section 18a and a T-piece 18d that mounts a spray nozzle 18e which directs a solid cone coarse spray of liquid (in this case cold water) at a relatively low pressure (e.g. about 10 p.s.i.g.) against a barrier 18f in the form of a plate having such number of circular apertures of about ½ inch diameter as to give rise to a gas velocity about 85 feet per second through the apertures with a pressure drop across the barrier of about 3 inches W.G. The spray liquid impinges on the barrier in the form of large droplets that break up into smaller droplets that move generally parallel with the face of the barrier, traversing the apertures at right angles to the direction of effluent flow therethrough and thereby intimately mixing with such effluent.

From the cooler 18 the effluent, with some entrained water, passes to separator box 22 in which most of the water is trapped. The effluent then passes to the filter 19 in which fine water particles are coalesced to facilitate their separation from the effluent in the cyclone separator 20. The water separated from the effluent in the separator 20 and that drained from the cooler drains 18c and from the separator box 22 contains the residual fluorine in the effluent leaving the column 16 but the concentration of fluorine in such water is so low as to render it unnecessary to treat such water prior to discharge to sewage.

As an indication of the performance of a three-stage gas-cooler of the form illustrated in FIGURE 2, such a gas-cooler was tested on the exhaust effluent of an oil-fired submerged combustion unit evaporating water and producing an exhaust effluent in the form of combustion products (713 lbs./hr. inert gas) saturated with water vapour, at 81° C. and atmospheric pressure. The (duct) internal diameter of the cooler was six inches and the barriers 18f were each formed with such number of circular apertures of one-half inch diameter as to produce a gas velocity through the apertures of about 85 ft./sec., with a pressure drop across each barrier of 2–3 inches W.G.

With such an arrangement it was found that by feeding 11.2, 5.8 and 2.1 gallons of water at 15° C. per minute to the respective spray nozzles 18d of the successive stages, (i.e. a total of 1150 gallons/hr.), the exit gas had a temperature of 30° C. Thus the exhaust gases were cooled from 81° C. to 30° C. and lost 405.5 lb./hr. of water by condensation in the cooler.

Gas/liquid contacting devices in accordance with the invention are ideally suited to use in plant where, from time to time, operating conditions are changed (e.g. to vary the throughput of the plant). In such cases, a device in accordance with the invention and designed to accommodate the maximum anticipated gas-flow may be readily adjusted to deal, with unchanged efficiency, with lesser gas-flows merely by plugging an appropriate number of apertures in the barrier to restore the correct gas-flow velocity in the remaining apertures.

The devices may be made with removable barriers, e.g. plate-like barriers secured against a shoulder in the duct by suitable clamps (or merely by gravity) to facilitate cleaning and for replacement of the barriers in maintenance or adjustment of the device to suit changed operating conditions.

We claim:

1. The method of cleaning a gas with a liquid that comprises the steps of passing a gas stream through a zone at a velocity in the range of 15 to 100 feet per second; causing said gas stream to flow with a velocity in the range 50 to 400 feet per second while said stream passes through apertures in a barrier obturating said zone and at the same time producing a pressure drop of from 15 to about 40 inches water gauge across said barrier; projecting a coarse spray of liquid at the upstream face of said barrier in a direction and at a velocity to cause large liquid droplets to break, on the upstream face of the barrier, into smaller droplets that move generally parallel with said barrier face and intercept the gas stream flowing through the barrier apertures; and removing any liquid accumulation on the downstream face of the barrier, the velocity in said zone being substantially lower than the velocity through said apertures.

2. The method of claim 1, wherein said gas stream is caused to flow with a velocity in the range 300 to 350 feet per second through said barrier apertures with a pressure drop across the barrier in the range 35 to 40 inches water gauge.

3. The method of claim 1, wherein the gas stream is caused to flow through apertures in said first barrier with a velocity in the range 100 to 400 feet per second with a pressure drop of at least 15 inches water gauge and thereafter to flow through apertures in a second barrier with a velocity in the range 50 to 150 feet per second with a pressure drop not exceeding 4 inches water gauge, a said coarse spray of liquid being projected at the upstream face of each said barrier.

References Cited

UNITED STATES PATENTS

| | | |
|---|---|---|
| 1,172,930 | 2/1916 | Brassert et al. |
| 1,296,466 | 3/1919 | Blumenburg. |
| 3,036,417 | 5/1962 | Mare et al. _____ 55—29 |
| 3,064,408 | 11/1962 | Erga et al. _____ 55—71 |
| 3,141,910 | 7/1964 | Pearce _____ 261—108 |

REUBEN FRIEDMAN, *Primary Examiner.*

J. ADEE, *Assistant Examiner.*

U.S. Cl. X.R.

55—94